Patented Jan. 26, 1954

2,667,425

UNITED STATES PATENT OFFICE 2,667,425

SELF-EXTINGUISHING ASPHALT COMPOSITION

Lester A. Bierly, Chautauqua, N. Y., assignor to Presque Isle Laboratories and Manufacturing, Inc., Erie, Pa., a corporation of Pennsylvania No Drawing. Application February 2, 1950, Serial No. 142,085

2 Claims. (Cl. 106—15)

This application is a continuation in part of my applications Serial No. 6,017, filed February 3, 1948, now abandoned, and Serial No. 60,273, filed November 16, 1948.

This invention is intended to produce a self extinguishing asphalt or asphalt composition which, while it will burn in the presence of a flame, will not support combustion as soon as the flame is removed. One use of this asphalt composition is in roofing, either as a coating or an impregnating material for asphalt shingles. Another use is in asphalt coated paper such as used for enclosing mineral wool insulating bats. A further use is in asphalt tile. Another use is in asphalt emulsions or paints. The self extinguishing properties are obtained from chlorinated paraffin and antimony oxide which have the property of producing a porous blister like crust in the presence of flame. The paraffin has the further property of releasing chlorine compounds which are trapped beneath the blister and stop the combustion as soon as the flame is removed. Additional fire resistance is imparted by hydrated lime which by itself does not make asphalt self extinguishing.

While usually the term asphalt is applied to natural asphalt or to asphalt derived from petroleum, in this application the term is also used to include similar substances such as pitch or coal tar. Typical asphalts are known as penetrating asphalts having a softening point in the region of 125° F. (80° F.–160° F.) and flexible coating asphalts having a softening point in the region of 225° F. (160° F.–300° F.).

A specific example of the composition is as follows:

I

| | Percent |
|---|---|
| Dried, powdered sludge | 20 |
| 70% chlorinated paraffin | 2½ |
| Asphalt or tar | Balance |

These percentages are susceptible of wide variation. The sludge may vary from 5% to 50%, and the chlorinated paraffin may vary up to 40%. High percentages of chlorinated paraffin make the asphalt brittle. The presence of inert mineral fillers reduces the quantity of asphalt and therefore requires less chlorinated paraffin.

The consistency of the composition may be varied by the use of solvents or thinners. If the composition is to be heated before use, e. g. for hot dipping, the chlorinated paraffin and sludge are added to molten asphalt or tar. This results in a solid composition which becomes fluid when heated above the melting point of the asphalt.

After glow may be prevented by additions of materials such as antimony oxide and zinc borate.

Flame retardants may be added. These may be chosen from the group of bismuth oxide, arsenic oxide, antimony sulfide, bismuth sulfide, arsenic sulfide, and antimony oxide.

At the temperatures used in hot dipping, which may be 300 to 450° F., the chlorinated paraffin breaks down, forming hydrochloric acid. It is therefore necessary that the asphalt contains a stabilizer which, at these temperatures, will either prevent decomposition of the chlorinated paraffin or which will combine with the hydrochloric acid.

The sludge is that resulting from the production of caustic alkali such as soda ash or caustic soda which has the following chemical analysis:

| | Percent |
|---|---|
| $CaCO_3$ | 60.0 |
| $Ca(OH)_2$ | 29.3 |
| $CaSO_4$ | 2.21 |
| $CaCl_2$ | 1.16 |
| $Mg(OH)_2$ | 1.9 |
| $Fe_2O_3Al_2O_3$ | 1.1 |
| $SiO_2$ | 1.9 |
| $NaCl$ | .064 |

It is believed that the active ingredients in this sludge which impart the fire resisting properties are derived from the hydrated lime ($Ca(OH)_2$ and $Mg(OH)_2$). The hydrated lime is a material which is substantially increased in volume (from 1.7 to 3.3 times) by the water of composition added during hydration. The water of composition of the calcium hydroxide is rapidly released at the temperature of 1076° F. The water of composition of magnesium hydroxide is rapidly released at a temperature of 662° F. Both of these temperatures are below flame temperatures used in the Underwriters' tests. The portion of the asphalt coating in contact with the flame breaks down the hydrated calcium and magnesium oxides. The release of the water of composition produces a foaming action on the heated or burning asphalt, resulting in a cellular structure which serves as a heat insulator for the layers of asphalt composition not in contact with the flame. The cellular or porous structure is further increased by the expulsion of the water of composition caused by decomposition at flame temperatures of the molecules of hydrated oxides of calcium and magnesium. Both of these oxides have the property of substantially increasing in physical volume upon hydration so that upon de-hydration a porous structure results.

Another important property of the hydrated oxides of calcium and magnesium is the reduction in viscosity of the asphalt composition. In a shingle coating composition, based upon the disclosure of the Fasold et al. and Greider et al. Patents Nos. 2,326,723; 2,326,724; and 2,424,234, the substitution of 50% (by weight) dried sludge for 50% (by weight) of the fibrous asbestos dust results in a lowering of the Wagner-Bowen plasticity value, as disclosed in Greider et al., Patent No. 2,424,234, from approximately 300 grams to approximately 150 grams. This reduction in viscosity may permit pumping of the asphalt composition since the Fasold et al. and Greider et al. compositions are too stiff for pumping and must be spread. This reduction in viscosity does not affect the fire resisting properties, although the teachings of the Fasold et al. and Greider et al. patents would indicate that a reduction in viscosity would decrease the fire resistance.

The other ingredients in the sludge are not believed to have a controlling effect upon fire resistance. The calcium carbonate or limestone alone does not have sufficient fire resisting effect. Possibly this is due to the high temperature at which the calcium carbonate breaks down, and to the slowness of break down at this elevated temperature. Furthermore, the carbon dioxide released upon break down is less effective in producing or causing foaming of the asphalt. The calcium chloride in the dried sludge does not contain any water, and if it did contain any water, the water would be released at the application temperatures of 400–500° F. The calcium sulphate likewise has its water of composition released prior to the application of the coating to the roofing. The silicon dioxide, sodium chloride, iron oxide and aluminum oxide are not believed to have any substantial effect in increasing the fire resistance, either due to the properties of the material or to the small amounts present.

The chlorinated paraffin is preferably in range of 50–80% chlorine. It is nontoxic at the temperatures of use (not at flame temperatures). Chlorinated paraffin in the presence of flame reacts with the asphalt to produce a foamy mass which has a pronounced heat shielding effect and at the same time there is a release of chlorides which have a snuffing action on the flame so the asphalt is self-extinguishing in the sense that it will burn only in the presence of an externally created flame. This reaction of chlorinated paraffin takes place at temperatures of from 300° F. up (depending upon the stabilizer), and even at these temperatures there is a permanent chemical and physical change in the asphalt which prevents the return of the foamy mass to the liquid or solid state upon cooling. The reaction of chlorinated paraffin is different from the reaction of other chlorinated hydrocarbons such as chlorinated naphthalene. In the presence of flame, an asphalt-chlorinated naphthalene mixture becomes very liquid, has little or no bubble formation, and apparently has no reaction with the asphalt even though the chlorides released by the naphthalene do have a snuffing action on the flame. The heat shielding effect is a property peculiar to chlorinated paraffin. The chlorinated paraffin preferably has a stabilizer which raises the break down temperature of the chlorinated paraffin above 350° F. It is desirable that the break down temperature of the chlorinated paraffin be at least 450° F. so that the chlorinated paraffin will not break down when the asphalt coating is heated for application to the roofing. Without stabilizers the chlorinated paraffin breaks down at about 300° F. to 350° F. and causes a foaming of the asphalt. Apparently this results in a permanent physical and chemical change, since the asphalt foam does not return to the solid or liquid state upon cooling and is substantially impossible to reheat as local hot spots set off the breakdown of the chlorinated paraffin into a progressive foam producing reaction. The action of the chlorinated paraffin is improved by the addition of antimony oxide which serves as a catalyst accelerating the breakdown and also as a flame retardant preventing after-glow due to the formation of antimony chloride, a heavy gas.

Stabilizers for chlorinated paraffin are well known. Some stabilizers are derivatives of ethylene oxide, propylene oxide, butylene oxide, phenyl ethylene oxide, tolyl ethylene oxide, diphenyl ethylene oxide, phenoxy propylene oxide, diethyl ethylene oxide, benzyl ethylene oxide, epichlorhydrin, glycide or its ethers, such as methyl-, ethyl-, propyl-, tolyl-, alpha or beta naphthyl-, also cyclopentene oxide, cyclohexene oxide; alkaline earth metal salts of aliphatic acids having from five to ten carbon atoms, of which strontium caprylate is an example; tetra aryl and alkyl substituted compounds of tin in which the alkyl or aryl groups have from four to twelve carbon atoms and of which tetra butyl tin, tetra phenyl tin, dibutyl diphenyl tin, and dibutyl tin dilaurate are examples. Further examples of stabilizers useful in this connection will occur to those skilled in the art, it being emphasized that the stabilizer to be effective must prevent the substantial evolution of hydrogen chloride from the chlorinated paraffin at hot dipping temperatures, such as 300–450° F., while being insufficiently of a stabilizing influence to prevent the substantial release of hydrogen chloride at flame temperatures. If the composition at room temperature is a liquid so it can be used without preliminary heating, the chlorinated paraffin and sludge may be added directly to the asphalt solution. The solvents or thinners usually used for asphalt are also solvents for the chlorinated paraffin.

In the presence of a flame ordinary asphalt becomes liquid, and once ignited burns freely after the flame is removed. The flame extinguishing asphalt is less fluid in the presence of a flame. The flame extingishing composition tends to remain in place instead of spreading. The finely divided particles of sludge on the burning surface form with the products of combustion of the asphalt a substantially impervious, blister-like slag coating. This slag coating has the functions of insulating the surface of the asphalt from the flame and of trapping gases beneath the coating. The presence of hydrogen chloride tends to snuff out any flame at the surface of the composition. While the slag may become red hot in the presence of a flame, as soon as the flame is removed the combustion stops almost immediately, usually in less than one second.

Another specific example is as follows:

II

| | Percent |
|---|---|
| Asbestos fiber-asphalt roof cement | 80 |
| 70% chlorinated paraffin | 20 |

This composition has better flame extinguishing properties than Example I.

Another specific example is as follows:

III

| | |
|---|---|
| Asphalt | 80%–50% |
| Antimony oxide | 10%–40 |
| 70% chlorinated paraffin | 10%–40 |
| Plus stabilizer if heated before use. | (2–5% of the weight of the chlorinated paraffin) |

Another specific example of an asphalt composition useful as a shingle coating or surface such as described in the Fasold and Greider patents is as follows:

IV

| | |
|---|---|
| Asphalt (flexible coating) | 43.5% to 65% |
| Sand | 43.5% to 15% |
| Glass fiber | 2.2% to 15% |
| 70% Chlorinated paraffin | 10.8% to 5% |

This composition when used as a granule carrying surface on asphalt impregnated paper roofing felt, as is conventional in the roofing industry, produces a shingle having Class "A" fire resistance. The sand is an inert filler. The glass fiber is a physical anchoring agent and to some extent a fire resistant ingredient. The fiber holds the composition in place. A shingle coated with this composition is self extinguishing in the sense that the asphalt will not support combustion except in the immediate presence of flame. The self extinguishing properties come from the chlorinated paraffin. The chlorinated paraffin also contributes to Class "A" fire resistance by causing a violent foaming of the asphalt which serves as a thermal insulator if it is mechanically stabilized or anchored by the incombustible fibers. The mineral filler (which may be any of the inert mineral fillers used in the shingle industry such as sand, slate flour, limestone dust, or active mineral fillers having heat resistant properties, such as sludge, hydrated lime, asbestos dust) gives some body to the foaming asphalt so that it is better able to support the weight of the brand used in the Class "A" Underwriters' test. It is not necessary that the mineral filler be of the sort capable of imparting fire resistance. The inert mineral fillers are equally satisfactory and usually cheaper. If the mineral fillers are of the sort producing fire resistance, such as sludge, hydrated lime, chrysotile asbestos dust, the amount of chlorinated paraffin may be decreased.

The fire resisting effect of the mineral filler is affected by the particle size in the sense that smaller particles have a greater surface than larger particles. Another factor is the adhesion between particles of filler. This effect is more pronounced in the case of fibrous particles having felting properties such as asbestos, and is still more pronounced in the case of particles which fuse together such as glass or rock wool fiber. The porosity of the particle at flame temperature is important both from the point of view of the interlocking action on the asphalt coating, and from the point of view of thermal insulation. Hydrated lime appears to be particularly effective in this respect. Hydrated lime, although soluble in water, does not tend to pick up moisture and developes its porosity at flame temperature. Any hydrated lime which becomes exposed during the weathering of the asphalt coating will tend to react with the carbon dioxide in the air and produce a protective skin of calcium carbonate.

The particle size of the dried sludge used in Example I is such that 99% passes a 50 mesh sieve, 95% passes a 100 mesh sieve, and 80% passes a 140 mesh sieve. It is very difficult to get the dried sludge to go through a 200 mesh sieve as the sludge is light and fluffy and the particles tend to ball up and adhere to each other. Under transmitted light the sludge particles appear to be round and very uniform in size. The particles at room temperature are slippery and have the feel of hydrated lime.

Another specific example of an asphalt composition which is useful in making asphalt coated paper such as used in buildings to provide a vapor barrier for mineral wool insulation is as follows:

V

| | |
|---|---|
| Chlorinated paraffin (70%) | 5–25% |
| Antimony oxide | 5–25% |
| Asphalt | Balance |

Another specific example of an asphalt composition which is useful in the manufacture of asphalt tiles is as follows:

VI

| | |
|---|---|
| Chlorinated paraffin (70%) | 5–25% |
| Antimony oxide | 5–25% |
| Asphalt and mineral fillers and colors | Balance |

As in the other compositions, stabilizers may be added if the composition is to be formed hot, e. g. 350° F.

The chlorinated paraffin should be solid at room temperatures and should contain as much chlorine as practical. 70% chlorinated paraffin is a readily available commercial form.

Chlorinated paraffin is also usable for fireproofing asphalt emulsions and paint. The asphalt emulsions usually have either a soap or clay base and have the consistency of soft butter. The emulsions may be thinned with water. Upon adding from 5–25% of 70% chlorinated paraffin and from 5–25% antimony oxide, a fireproof emulsion is obtained. No stabilizer is necessary for this application as the chlorinated paraffin may be mixed with the emulsion without heat.

Asphalt paints consist of asphalt and thinner such as a solvent, usually a petroleum oil. Since the solvents for asphalt are also solvents for chlorinated paraffin, asphalt paints may be fireproofed by the addition of from 5–25% of 70% chlorinated paraffin and from 5–25% of antimony oxide.

In the emulsions and paints the fireproofing properties of the chlorinated paraffin result from foaming of the asphalt in the presence of the flame, producing a thermal insulating product which protects the coated material, and from the breakdown of the chlorinated paraffin, releasing chlorides which have a snuffing action on the flame and which react with the antimony oxide producing antimony chloride, a heavy gas. While the emulsions and paints will burn in the presence of an externally created flame, as soon as the flame is removed the combustion of the asphalt emulsions or paint is immediately extinguished.

Self-extinguishing asphalts may be made by direct chlorination of asphalt but asphalt is such a complex substance that unwanted chlorine compounds are formed so the chlorinated asphalt is not as practical as chlorinated paraffin, at present.

All of the examples are subject to variation depending upon the combustibility of the asphalt and the use of the composition. Low softening point asphalts are more combustible than high softening point asphalts. Asphalt which in use has a limited surface exposed to flame requires less fire resisting material than asphalt having a large exposed surface such as in asphalt coated paper. Asphalt on a horizontal surface is less combustible than asphalt on an inclined or vertical surface. Mineral fillers reduce the combustibility. These are factors which are well understood and which permit modification of the composition.

The examples show (1) that chlorinated paraffin has unique properties in combination with asphalt; (2) that antimony oxide supplements and improves the action of the chlorinated paraffin, and (3) that hydrated lime or sludge are active in increasing the fire resistance of the asphalt.

As a guide in formulating asphalt shingle coating compositions, Class "A" fire resistance will be imparted to asphalt in the following proportions: 1 part hydrated lime to 9 parts asphalt, 1 part sludge to 4 parts asphalt, 1 part glass or rock wool to 4 parts asphalt. The glass or rock wool also serves to mechanically anchor the coating on inclined surfaces. The sludge or hydrated lime on inclined surfaces, should be supplemented by some fibrous or other material which will prevent sliding of the coating. 5% fiber is usually enough.

I claim:

1. A self extinguishing asphalt composition comprising a mixture of asphalt, chlorinated paraffin in the range 5–40%, and antimony oxide in the range of 5–40%, the combined weight of the chlorinated paraffin and antimony oxide being in the range of 25% to 100% of the asphalt, the chlorinated paraffin being at least 50% chlorinated, and the balance being substantially inorganic filler.

2. A self-extinguishing asphalt composition comprising a mixture of asphalt, chlorinated paraffin in the range 5–40%, antimony oxide in the range 5–40%, hydrated lime in the range 1½–15%, the combined weight of the chlorinated paraffin, antimony oxide and hydrated lime being in the range of 25% to 100% of the asphalt, the chlorinated paraffin being at least 50% chlorinated, and the balance being substantially inorganic filler.

LESTER A. BIERLY.

References Cited in the file of this patent
UNITED STATES PATENTS

| Number | Name | Date |
|---|---|---|
| 134,522 | Crossman | Jan. 7, 1873 |
| 2,025,929 | Young | Dec. 31, 1935 |
| 2,128,392 | Albion | Aug. 30, 1938 |
| 2,299,612 | Clayton et al. | Oct. 20, 1942 |
| 2,412,303 | Spitzli et al. | Dec. 10, 1946 |
| 2,472,112 | Leatherman | June 7, 1949 |